United States Patent [19]
Matherne

[11] 3,899,920
[45] Aug. 19, 1975

[54] TUBING TESTING TOOL

[76] Inventor: Carrol J. Matherne, P.O. Box 763, Houma, La. 70360

[22] Filed: Mar. 27, 1974

[21] Appl. No.: 455,324

[52] U.S. Cl. .............................................. 73/40.5 R
[51] Int. Cl. ............................................ G01m 3/08
[58] Field of Search .............. 73/40.5 R, 49.1, 49.8; 138/90; 166/147, 187

[56] References Cited
UNITED STATES PATENTS

| | | | |
|---|---|---|---|
| 2,793,524 | 5/1957 | Badger | 73/40.5 R |
| 2,998,721 | 9/1961 | Gawlik | 73/40.5 R X |
| 3,165,919 | 1/1965 | Loomis | 73/40.5 R |
| 3,165,920 | 1/1965 | Loomis | 73/40.5 R |
| 3,199,598 | 8/1965 | Loomis | 73/49.1 X |
| 3,495,443 | 2/1970 | Phillips et al. | 73/40.5 R |

*Primary Examiner*—Charles A. Ruehl
*Attorney, Agent, or Firm*—Clarence A. O'Brien; Harvey B. Jacobson

[57] ABSTRACT

A tool for testing tubing as the tubing string is being made up and positioned in a well bore incorporating spaced packers to isolate a portion of the tubing string for subjecting the isolated portion to test pressure with the test fluid being supplied through a passageway in the tool. The tool includes unique structural arrangements so that identical components are used in the upper and lower packer, in inverted position, to enable the tool to be assembled, maintained and repaired with the least possible number of parts. The tool passageway for the packer setting fluid includes an inclined passageway inclined in the direction of movement of a piston and exits into the expansible chamber so that it impinges on the piston for imparting its greatest force in the direction of movement of the piston. The same passageway which receives the packer setting fluid also receives the test fluid with a lateral passageway being provided in the mandrel for communication with a test space with the lateral passageway in the lower mandrel of the tool being blocked off so that the test fluid exits from the tool into the annular test space at a point adjacent the upper packer. The unique construction of the mandrel and other components provides for a larger diameter shaft dimension for a given size tool thereby enabling a tool to be employed with a wider range of tubing sizes or thicknesses by utilizing packing and spacer rings having different dimensions.

14 Claims, 10 Drawing Figures

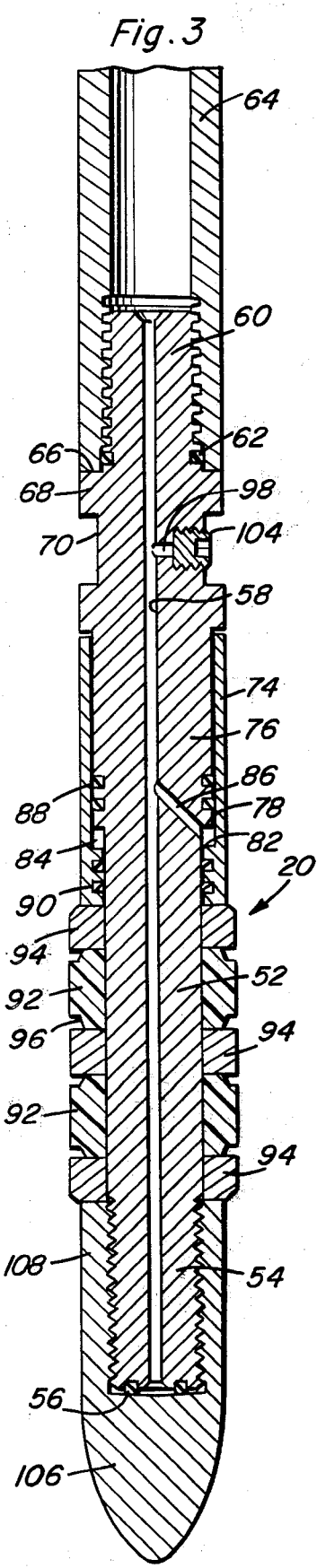

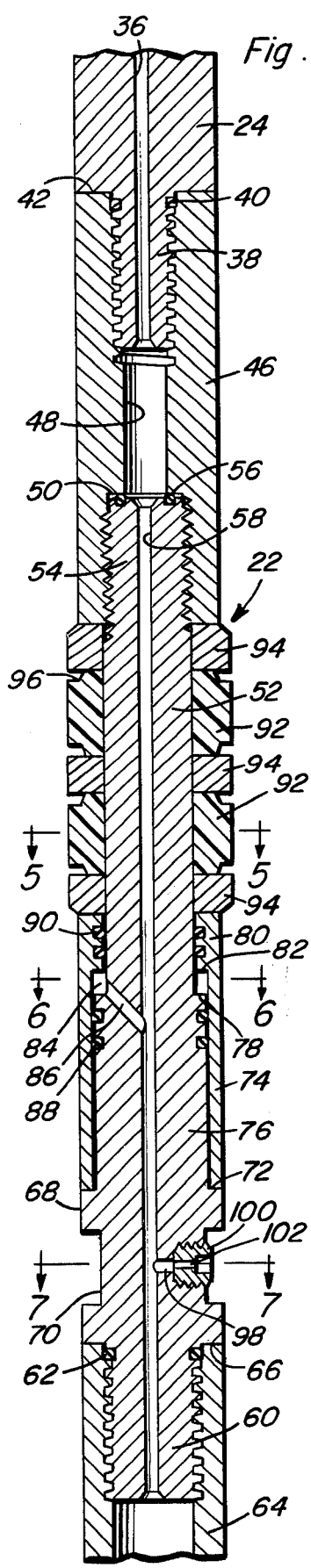
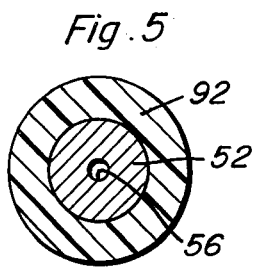
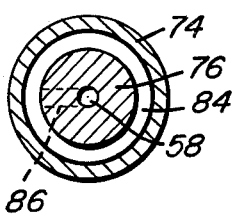
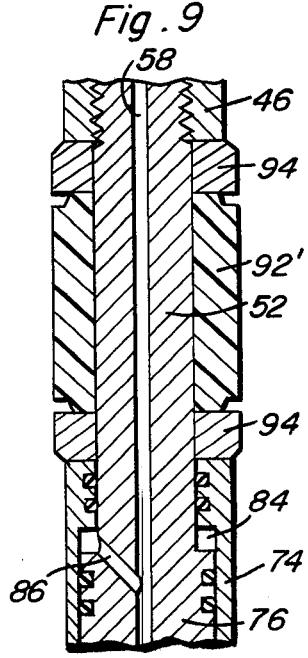
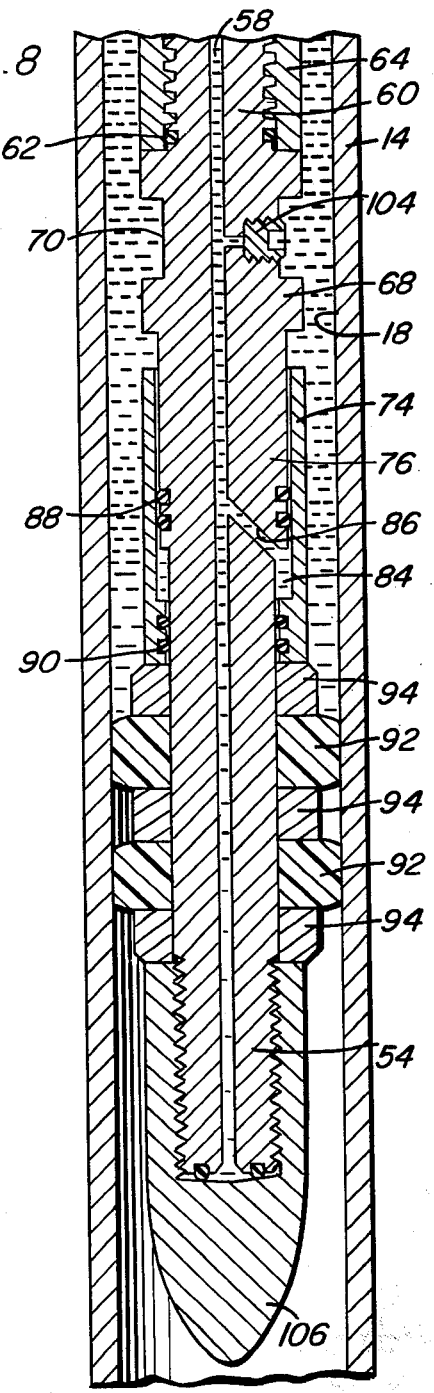
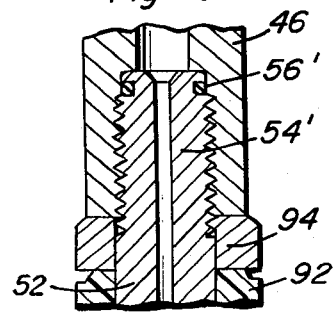

TUBING TESTING TOOL

BACKGROUND OF THE INVENTION

1. Field of the Invention

The present invention generally relates to a tubing testing tool and more particularly a tool having reversible parts, an inclined passageway communicating with the expansible chamber in each of the packers on the tool and a larger diameter shaft component to enable differently dimensioned packer elements to be employed to enable a single tool to be used with a larger variety of internal diameter tubing.

2. Description of the Prior Art

Pressure testing of tubing, pipe and the like to determine the presence of leaks as the tubing string is being made up and lowered into a well bore is a well known technique. Basically, a testing tool is sequentially lowered into the uppermost stand of tubing or pipe being lowered into a well bore and longitudinally spaced packers are expanded to isolate an annular test space between the packers and externally of the tool. This test space is then subjected to high pressure fluid with leaks being tested by monitoring the pressure of the test fluid. The tool is supported from a cable connected with a draw works for raising and lowering the tool respectively and connected with a conduit usually in the form of a flexible hose or hoses for supplying fluid pressure to expand the packers and convey test fluid to the isolated annular space between the packers.

One example of this type of testing tool is disclosed in prior U.S. Pat. No. 3,495,443, issued Feb. 17, 1970 but in this patent, the packer setting fluid and the testing fluid are introduced into separate passageways in the tool by independent supply hoses. Other types of tools are used in which a single hose and passageway are provided for both the packer setting fluid and test fluid with one such tool having previously been manufactured by Brown Oil Tools, Inc., of Houston, Texas which is disclosed in this application as "prior art". While such tools have been utilized and operate satisfactorily to a certain degree, there has been a continuing need for a tool which can be set and released in less time and more efficiently, a tool which can be used with various tubing sizes and weights, a tool that is more flexible in use and stronger at certain critical points to enable higher test fluid pressures.

SUMMARY OF THE INVENTION

An object of the present invention is to provide a tubing testing tool in which the components of the lower packer and upper packer are of identical construction but reversible to provide greater flexibility of assembly and enable greater flexibility in handling any weight tubing of a particular size with the shaft or mandrel component having a larger diameter for enabling packer rings and spacers of different dimensional characteristics to be mounted thereon thereby enabling the tool to be used with different weight tubings having different internal diameters by merely changing the packing rings and spacers.

Another object of the invention is to provide a tubing testing tool in accordance with the preceding object in which the passageway for setting the packers extends axially of the tool with the passageway which communicates with the setting chamber in both the upper and lower packer being inclined in the direction of movement of the movable component of the expanding setting chamber thereby more efficiently utilizing the kinetic energy of the moving fluid to more rapidly set the packers and more efficiently utilize the setting fluid.

A further object of the present invention is to provide a tubing testing tool in accordance with the preceding objects in which the passageway for the testing fluid is the same as that for the setting fluid and includes a lateral passageway communicating with the annular test space between the packers at a point adjacent the upper packer so that the testing fluid passes the shortest possible distance through the passageway in the tool and to avoid the possibility of sand or other similar material blocking the fluid movement by utilizing a plug to block off the test fluid passageway in the lower packer mandrel.

Still another important object of the invention is to provide a tubing testing tool in accordance with the preceding objects in which the shaft components and threaded connection between the components are of greater dimensional character due to the unique construction thereof for increasing the strength at the notoriously weak points of existing tools of this type to not only increase the strength capabilities of the tool but also to enable a given size tool to be used with different size tubing and tubing of different weights having different internal diameters thereby increasing the efficiency of use of the tool by reducing the inventory of tools necessary to effectively test the various tubing sizes and weights employed in the industry.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is an elevational view of the tubing testing tool of the present invention installed in a tubing string or the like.

FIG. 2 is a longitudinal sectional view of the lower end portion of a testing tool presently being employed in the industry and labeled as prior art.

FIG. 3 is a sectional view of the lower end portion and lower packer of the present invention oriented in a manner comparable to the prior art illustrated in FIG. 2 for comparison purposes.

FIG. 4 is a longitudinal, sectional view of the upper end portion including the upper packer of the testing tool of the present invention.

FIG. 5 is a transverse, sectional view taken substantially upon a plane passing along section line 5—5 of FIG. 4 illustrating the association of the packing ring and mandrel.

FIG. 6 is a transverse, sectional view taken substantially upon a plane passing along section line 6—6 of FIG. 4 illustrating the association of the mandrel and cylinder or sleeve and the setting chamber therebetween.

FIG. 7 is a transverse, sectional view taken substantially upon a plane passing along section line 7—7 of FIG. 4 illustrating the testing fluid passageway and orifice plug associated therewith.

FIG. 8 is a sectional view similar to FIG. 3 illustrating the lower packer and lower end portion of the tool in association with a tubing illustrating the manner in

3 which the packer sealingly engages the inner surface of the tubing.

FIG. 9 is a longitudinal sectional view of a modified packer construction.

FIG. 10 is a fragmental, longitudinal sectional view illustrating a modified arrangement of O-ring seal in the threaded connection.

DESCRIPTION OF THE PREFERRED EMBODIMENTS

Referring now specifically to the drawings, the tubing testing tool of the present invention is generally designated by numeral 12 and is associated with a tubing string 14 which includes a threaded connection, coupling, collar or the like 16 therein for the purpose of testing the tubing string 14 by isolating an annular test space 18 between the external surface of the tool 12 and the internal surface of the tubing string 14 and between a lower packer generally designated by numeral 20 and an upper packer generally designated by the numeral 22. This testing procedure is well known and various fluids may be used for test purposes with the testing pressure being at predetermined values depending upon the particular type of tubing, pipe or the like being tested.

The testing tool 12 includes an elongated cylindrical tool head 24 having a lift cable or wire line 26 connected therethrough by a loop on the cable extending through a transverse bore 28 in the tool head 24 and received in longitudinal grooves in diametrically opposed portions thereof so that the lift cable does not extend beyond the periphery of the tool head. Also, the tool head 24 is provided with a longitudinal groove 30 therein which communicates with a rounded tapered upper end and receives a fluid pressure hose 32 therein with the hose 32 being connected to a fitting 34 at the bottom of the groove. The fitting 34 communicates with a longitudinal centrally disposed passageway 36 in the tool head 24 which extends to the bottom end thereof as illustrated in FIG. 4. As illustrated, the tool head 24 includes an externally threaded axial extension 38 on the lower end thereof with the extension including an O-ring seal 40 at the end thereof adjacent a shoulder 42 defined by the lower end of the head. Also, the tool head is provided with a wrench accommodating polygonal area or flat spot 44 adjacent the lower end thereof to facilitate assembly of the tool.

Attached to the tool head 24 is a sleeve or nipple 46 having an internal bore 48 and a relatively thick wall which is internally threaded at its upper end and is in threaded engagement with the externally threaded axial extension 38 as illustrated in FIG. 4. The lower end of the nipple 46 is also internally threaded with the internal threads being of greater diameter than the bore 48 thereby providing a shoulder 50 at the inner end of the internally threaded lower end portion of the nipple 46 as illustrated in FIG. 4.

The upper packer 22 includes an elongated mandrel or shaft 52 having its upper end 54 externally screw-threaded and detachably engaged with the internal threads on the lower end of the nipple 46. The axial end of the threaded end 54 of the mandrel 52 is provided with an O-ring seal 56 in sealing engagement with the shoulder 50 as illustrated in FIG. 4. The mandrel 52 is provided with a longitudinal passageway 58 extending throughout the length thereof and the lower end of the mandrel 52 is externally threaded in the area indicated by numeral 60 with an O-ring seal 62 being provided at the upper end of the threaded end 60 with the O-ring seal 62 sealingly engaging an elongated, internally threaded tubular member or bar 64 which may be of any desired length. The upper end of the bar 64 abuts a shoulder 66 on an enlarged portion 68 of the mandrel which also includes flats 70 for receiving a wrench to assemble the tool. The upper end of the enlarged portion 68 of the mandrel 52 also defines a shoulder 72 which limits the longitudinal sliding movement of a sleeve or cylinder 74 in one direction. The sleeve or cylinder 74 closely surrounds a piston formed integrally with the mandrel 52 as designated by numeral 66 with the piston being slightly greater in diameter than the major length portion of the mandrel 12. The greater diameter of the piston where it joins with the mandrel 52 defines a shoulder 78 and the upper end of the sleeve 74 includes an inwardly offset reduced diameter area or flange 80 which defines an opposing shoulder 82 with the shoulders 78 and 82 and the external diameter of the mandrel 52 and the internal diameter of the sleeve 74 forming a setting chamber 84. The setting chamber 84 is communicated with the passageway 58 by an inclined passageway 86 which is inclined longitudinally in a direction in which the sleeve 74 moves when the setting chamber 84 is expanded due to the admission of setting fluid into the chamber 84. The external surface of the piston 76 is provided with a pair of adjacent O-ring seals 88 and the flange 80 is also provided with a pair of O-ring seals 90 to seal the fluid pressure in the setting chamber 84. Thus, as pressure is admitted into the bore 58, it will pass through the passageway 86 into the setting chamber 84 and cause the setting sleeve or cylinder 74 to be moved longitudinally toward the upper end of the mandrel 52.

Mounted on the mandrel 52 between the upper end of the sleeve 74 and the lower end of the nipple 46 is a pair of annular packing rings 92 and three annular spacers 94 in an alternate arrangement. As illustrated, the packer rings 92 are of resilient material of rubber, neoprene or other similar material impervious to deleterious action by fluids normally encountered in an oil well or the like. The external diameter of the packer rings 92 and the spacer rings 94 is substantially the same and the peripheral corners of the packer rings 92 may be recessed or relieved as at 96 to enable circumferential expansion of the packer rings 92 when the sleeve 74 is moved upwardly with the circumferential expansion of the packer rings 92 being such as to sealingly engage the internal surface of the tubing string 14 for isolating the annular test space 18.

In addition to the passageway 86 for the setting fluid, the passageway 58 is also communicated with a radial passageway 98 which communicates with one of the flat spots 70 and which has an enlarged outer end portion screw-threadedly receiving a removable plug 100 which has an orifice 102 extending therethrough thereby communicating the passageway 58 with the peripheral exterior of the upper packer between the ends of the enlarged portion 68 of the mandrel 52.

The bars 64 may be of any desired length depending upon the fluid being used as a test fluid and depending upon the length of the tubing to be tested with the desired length of the bars being made up when the tool is assembled.

The lower end of the bar or bars 64 is internally threaded as illustrated in FIG. 3 and is screw-threadedly engaged with the lower packer 20. The lower packer 20 includes exactly the same elements as the upper packer 22 except that the elements are reversed. In order to indicate the identical character of the components, the same reference numerals are employed in connection with the lower packer as with the upper packer with there only being two differences. One difference is that a solid plug 104 is used to block the radial passageway 98 rather than the plug with an orifice therein as designated by numeral 100 in the upper packer. Thus, the testing fluid is not discharged from the lower mandrel 52. While the components in the lower packer are identical, they are inverted in relation to the upper packer, that is, the upper threaded end 54 of the mandrel 52 now becomes the lower threaded end as illustrated in FIG. 3. The other difference is that the lower packer is provided with a rounded and tapered bottom end member 106 which is provided with an internally threaded upper end portion 108 which threads onto the threaded end 54 of the mandrel 52 with the bottom of the internal threaded bore sealingly engaging the O-ring seal 56 and the upper end of the bottom end 106 defining a shoulder 110 for engaging the lowermost spacer ring 94.

FIG. 9 illustrates a slightly modified form of packer in which a single elongated deformable, resilient sleeve 92' is used in lieu of the two packer rings 92 illustrated in FIG. 4 and thus, in effect, removing the necessity of one of the spacers 94 and thus, only two spacers 94 are employed. Otherwise, the association of the components of FIG. 9 are the same as that illustrated in FIG. 4 and represents an alternate packer ring assembly with the one relatively long resilient packing sleeve or ring 92' reducing the number of components and enabling a greater circumferential expansion of the packing element.

FIG. 10 illustrates a modified O-ring seal arrangement in which the externally threaded end portion 54' of the mandrel 52 is provided with an O-ring seal 56' on the external periphery adjacent the end thereof for sealing engagement with the corresponding internal portion of the sleeve or nipple 46 or the lower end member 106 thereby providing an alternate O-ring seal assembly for the threaded connections with this arrangement being usable in any of the threaded connections.

The prior art structure illustrated in FIG. 2 is comparable to the lower packer 20 illustrated in FIG. 3 and includes a bar or tubular member 164 comparable to the bar 64 in FIG. 3. A piston member 168 is provided with an upper threaded axial extension 160 of reduced diameter for screw-threaded engagement with the bar 164. The piston member 168 has a flat area 170 for receiving a wrench or similar tool to assemble the testing tool and the lower end of the piston member includes a reduced diameter cylindrical piston 176 which has a pair of O-ring seals 188 adjacent the lower end thereof in sealing engagement with a cylindrical sleeve 174 that has its lower end reduced in diameter to define an inwardly extending flange 180. The lower end of the piston 174 defines a surface or shoulder 178 in opposed relation to a shoulder or surface 182 defined by the upper end of the flange or reduced portion 180 with the shoulders 178 and 182 together with the interior of the sleeve 174 and the exterior of a rod 153 defining a setting chamber 184. The rod 153 is rigidly affixed to or integral with a lower end member 206 which is tapered and rounded and extends axially through a tubular mandrel 152 which forms an extension of the sleeve 174 and is of reduced diameter in relation thereto. The upper end of the rod 153 is screw-threaded into an internally threaded lower end portion of the piston member 168 is indicated by numeral 169 and is sealed with respect to the expansion chamber by O-ring seals 190 in the inner surface of the flange 180. The piston member 168 is provided with a passageway 158 for setting fluid which extends through a passageway 158' in the rod 153 and then out through a radial passageway 186 into the setting chamber 184 for expanding the setting chamber and causing downward movement of the sleeve 174 in relation to the piston 176 thus causing downward movement of the mandrel 152 on the rod 153. Alternate spacer rings 194 and packer rings 192 are received on the mandrel 152 with the lowermost spacer 194 being engaged with a spacer sleeve 195 which extends between the upper end of the lower member 206 and the lowermost spacer ring 194 to provide for movement of the mandrel 152 downwardly for compressing and expanding the resilient packer rings 192 for sealing engagement with the interior of a tubing string to be tested. The lower end portion of the spacer sleeve 195 has apertures 195' therein for the purpose of bleeding any fluid therefrom to eliminate any collection of fluid or other material in the interior of the spacer sleeve 195.

In comparing the structure illustrated in the prior art in FIG. 2 with the present invention in FIG. 3, the effective diameter and strength of the mandrel or shaft 52 in FIG. 3 is substantially greater than the rod 153 in the arrangement of FIG. 2 with the tubular mandrel 152 in FIG. 2 actually forming the internal diameter of the packer rings and spacer rings. The additional thickness or diameter of the shaft or mandrel in FIG. 3 provides greater strength to the construction and enables thicker packer rings and spacer rings to be used on the same mandrel over a wide range of differences in dimensions. This enables a single tool to be used in association with any weight tubing of a particular size. For example, a 2⅜ inch tubing is available and is used in several different weights with each weight having a different internal diameter. The thicker shaft 52 allows a wider latitude in varying the dimensions of the rings to fit and effectively seal various weight tubings having different internal diameters. When a small shaft is used, protrusion of the wider rings may strike the pipe or tubing when being inserted or removed which sometimes results in breakage of the tool. The increased strength is also important in setting the packers and in pressuring the test space by enabling higher test pressures to be employed to more effectively test the tubing or pipe. The passageway leading into the setting chamber is oriented at approximately 45° where it enters the chamber instead of at 90° at the bottom as in FIG. 2 so that the movement of the fluid serves to more effectively expand the setting chamber since movement of the fluid is directed in the direction of movement of the shoulder 82 rather than in a direction parallel thereto as in FIG. 2. Also, there is no threaded connection in the area of the expansion chamber as occurs in FIG. 2 where the rod 153 threads into the member 168. This threaded connection in FIG. 2 produces a weak point in the assembly and the reduced size of the rod 153 throughout its length and where it connects with the lower member 206 also is a weaker construction than that employed in FIG. 3. Thus, placing the threads at the opposite ends of the mandrel as in FIGS. 3 and 4 rather than at the expansion chamber location in the central area thereof as in FIG. 2 greatly increases the strength and dependability of the tool. Also, the threads 54 may be different from threads 60 to assure that the threads 60 will always be engaged with the bars or tubes 64 thereby eliminating the possibility of assembling the tool in an improper manner.

In tools for testing tubing employing the present invention, the mandrel has a diameter greater than one-half the internal diameter of the tubing. Also, a single tool can be used with different internal diameter tubing as set forth in the following comparative chart.

| Tubing Diameter | Mandrel Diameter New Tool | Mandrel Length New Tool |
|---|---|---|
| 2.375" | 1.250" | 6.50" |
| 2.875" | 1.650" | 6.50" |
|  | Old Tool | Old Tool |
| 2.875" | 1.00" | 9.50" |

The use of identical components, in inverted relation, in the upper and lower packers and the capability of utilizing the same tool for testing different weight tubing or pipe enables the testing operation to be more effectively accomplished with less time required in acquiring and using different size tools and also requires a smaller inventory of testing tools by business organizations engaged in the testing of tubing, pipe and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool for pressure testing tubing, pipe and the like comprising an upper packer and a lower packer, each packer including a mandrel, means extending between the mandrels to retain the packers in longitudinally spaced relation, each packer including a deformable packing means expansible into sealing contact with the interior of the tubing to isolate a test space, each mandrel extending throughout the length of the packing means, said tool including passage means for packer setting fluid communicating with the periphery of each mandrel adjacent a peripheral shoulder thereon, a sleeve slidable on each mandrel and including an internal flange in spaced, opposed relation to the shoulder to define a setting chamber for receiving setting fluid for moving the sleeve longitudinally on the mandrel, said packing means including at least one resilient, deformable annular packing member in encircling relation to the mandrel with an end portion of the sleeve engaged therewith for compressing the packing member and expanding it circumferentially toward the tubing surface, said passage means also including a portion for discharging test fluid into the test space, each of said mandrels being unitary and identical in construction.

2. The structure as defined in claim 1 wherein said passage means includes a radial portion inclined longitudinally toward the flange on the sleeve for discharging pressure setting fluid into the chamber in the direction of movement of the sleeve.

3. The structure as defined in claim 1 wherein said portion of the passage means discharging test fluid includes a radial passageway in the mandrel, a closure plug in the radial passageway in the lower mandrel and an orifice plug in the radial passageway in the upper mandrel.

4. The structure as defined in claim 1 wherein said packing means includes a plurality of annular, rigid spacer rings and a plurality of annular packing members with the packing members and spacer rings being alternately arranged on said mandrel, the lower mandrel including a bottom end member screw-threaded onto the mandrel and defining a shoulder engaging the end of the packing means oppositely disposed in relation to the end portion of the sleeve so that as the sleeve on the lower packer is moved downwardly, the packing members are compressed and expanded, the upper packer being threadedly supported from a tool head defining a shoulder in opposed relation to the end portion of the sleeve on the upper packer for compressing the packing members and expanding them circumferentially when the upper sleeve is moved upwardly on the mandrel.

5. The structure as defined in claim 4 wherein said tool head includes means thereon for connection with a flexible supporting member to enable the tool to be oriented in a desired position in the tubing, said tool head including a fitting adapted to receive a single hose for supplying setting and testing fluid.

6. The structure as defined in claim 1 wherein each mandrel has each end thereof provided with external screw threads to enable the mandrel to be oriented in inverted position when used as either the upper mandrel or lower mandrel, said packing means being of annular configuration and closely encircling said mandrel with the diameter of the threaded end portions and the portion of the mandrel receiving the packing means being of substantially constant diameter and being only slightly less in diameter than the sleeve with the packing means extending only slightly radially beyond the sleeve when unexpanded to facilitate the tool being run into and removed from the tubing.

7. The structure as defined in claim 1 wherein said passage means includes a longitudinal passageway extending throughout the length of each mandrel, said means extending between the mandrels including a hollow, rigid tubular member screw-threadedly connected to the upper and lower mandrels and defining a passageway between the mandrels, said passage means for packer setting fluid including an inclined passageway communicating with the longitudinal passageway and communicating with the setting chamber for discharging setting fluid into the setting chamber in the direction of movement of the flange on the sleeve, said portion of the passage means for discharging test fluid including a radial passageway in each mandrel, the radial passageway in the lower mandrel being closed with a plug and the radial passageway in the upper mandrel having means communicating with the test space for discharging test fluid into the test space.

8. The structure as defined in claim 7 wherein said upper packer is supported from a tool head, said tool head including means thereon for connection with a flexible supporting member to enable the tool to be oriented in a desired position in the tubing, said tool head including a fitting adapted to receive a single hose for supplying setting and testing fluid, each end of each mandrel being externally threaded, O-ring seal means associated with each externally threaded end of the mandrel, the lower mandrel including a bottom end member screw-threaded thereon and defining a shoulder engaging the packing means on the lower mandrel, said tool head defining a shoulder engaging the upper packing means whereby longitudinal movement of the sleeve toward the respective shoulders will compress and expand the packing means.

9. In a tubing testing tool, a mandrel of one-piece construction in the form of an elongated cylindrical member having each end thereof externally threaded and including a major length of at least the diameter of the external threads, a longitudinal passage extending through the mandrel, a radial passage communicating with the periphery of the mandrel and the longitudinal passage for discharging test fluid externally of the mandrel, an inclined radial passage communicating with the longitudinal passage and the periphery of the mandrel for discharging packer setting fluid to a setting chamber for moving a packer compressing element longitudinally of the mandrel, the radial passageway for testing fluid being provided with a screw-threaded outer end portion for receiving a solid plug to block off the testing fluid when the mandrel is used in a lower packer and receiving an orifice plug for discharge of test fluid when the mandrel is used in an upper packer in the tool.

10. The structure as defined in claim 9 wherein each screw-threaded portion of the mandrel includes O-ring seal means for sealing the mandrel to other longitudinal portions of the tool.

11. In a tubing testing tool, a mandrel of unitary construction including an elongated cylindrical member of constant diameter over a major portion of its length, a cylindrical enlarged portion adjacent an end portion of said elongated cylindrical member and defining a radial shoulder extending circumferentially thereof for forming a portion of an expansible and contractable chamber, said mandrel including threaded end portions for detachable engagement with other components of the tool and enabling the mandrel to be assembled with the other components of the tool in inverted positions for use as a portion of a lower packer means or as a portion of an upper packer means, said mandrel including a longitudinal passageway, a lateral passageway communicating with the longitudinal passageway and with the external surface of the cylindrical member at the shoulder for permitting flow of packer operating fluid in relation to the chamber when the tool is assembled, and, a second lateral passageway communicating the longitudinal passageway and the external surface of the enlarged portion of the mandrel for permitting flow of testing fluid to a testing space around the tool, and means for closing said second lateral passageway when the mandrel is used as a portion of the lower packer means whereby test fluid will pass through the lateral passageway only when the mandrel is used as a portion of the upper packer means.

12. The structure as defined in claim 11 wherein the diameter of the major portion of the mandrel is approximately 1.250 inches when the tubing is approximately 2.375 inches internal diameter and 1.625 inches when the tubing is approximately 2.875 inches internal diameter.

13. The structure as defined in claim 11 wherein said lateral passageway permitting flow of packer operating fluid is inclined in relation to the external surface of the cylindrical member for directing fluid away from the shoulder with the outer end of the inclined passageway communicating with the external surface of the cylindrical member at the inner edge of the shoulder.

14. A tool for pressure testing a tubular member comprising an upper packer and a lower packer, each packer including a mandrel, means extending between the mandrels to communicate the packers, each packer including a deformable packing means expansible into sealing contact with the interior of a tubular member to isolate a test space, each mandrel extending throughout the length of the packing means and having a peripheral shoulder thereon, said tool including passage means for packer setting fluid communicating with the periphery of each mandrel adjacent said peripheral shoulder, a sleeve slidable on each mandrel and including an internal flange in spaced, opposed relation to the shoulder to define an expansible chamber for receiving setting fluid for moving the sleeve longitudinally on the mandrel, said packing means including at least one resilient, deformable annular packing member in encircling relation to the mandrel with an end portion of the sleeve engaged therewith for compressing the packing member and expanding it circumferentially toward the interior of the tubular member, said passage means also including a portion for communicating with the periphery of the mandrel in longitudinally spaced relation to the sleeve for discharging test fluid into the test space, each of said mandrels being identical in construction and provided with screw-threaded end portions to enable interchangeable use of the mandrels as either an upper or lower mandrel, and plug means for blocking off the portion of the passage means for discharging test fluid in one of said mandrels.

* * * * *